Nov. 16, 1937.  C. SEIDLER  2,099,412
DISPENSING CONTAINER
Filed March 9, 1936
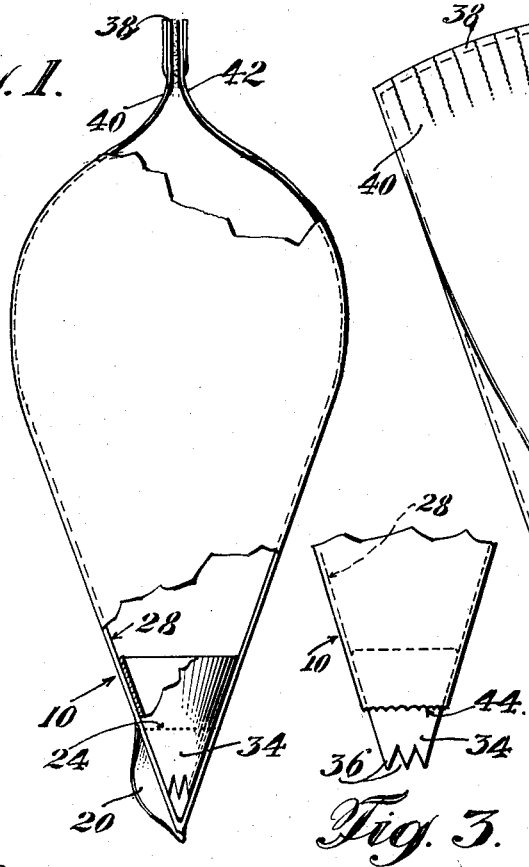
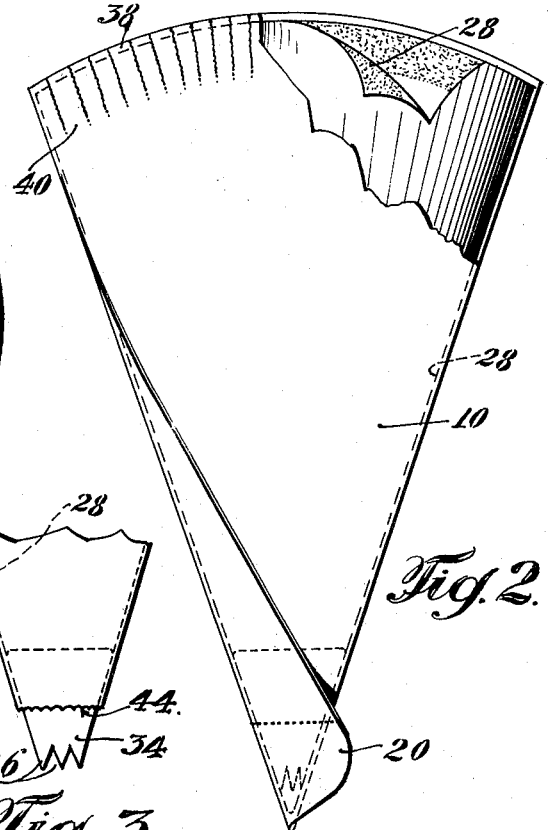
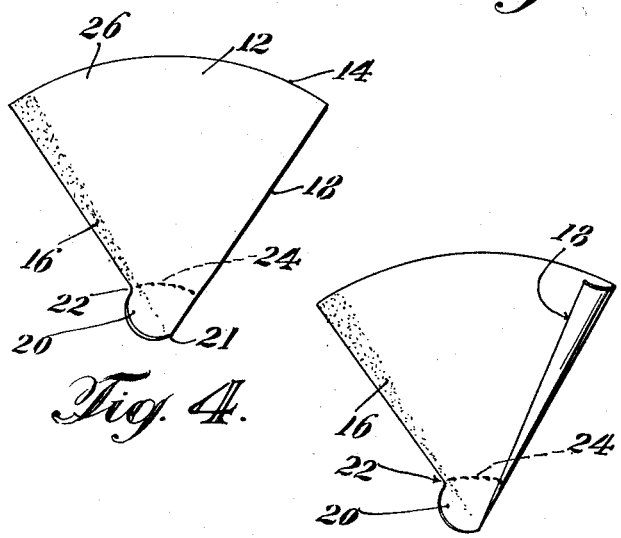
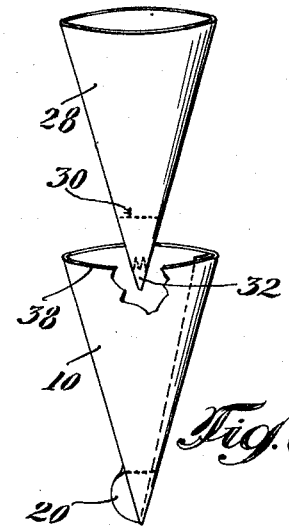
INVENTOR.
Carl Seidler
BY Irving F. Goodfriend
ATTORNEY.

Patented Nov. 16, 1937

2,099,412

UNITED STATES PATENT OFFICE 2,099,412

DISPENSING CONTAINER

Carl Seidler, New York, N. Y.

Application March 9, 1936, Serial No. 67,824

9 Claims. (Cl. 221—60)

This invention relates to a dispensing container for plastic substances.

My invention contemplates the provision of a container in which plastic food substances such as whipped cream, mayonnaise, prepared icings and the like can be packed for distribution and sale.

My invention further contemplates the provision of such a container from which the plastic food substance may be easily dispensed as desired.

My invention further contemplates the provision of such a container which may be readily converted into a decorating dispensing device.

My invention further contemplates the provision of such a container which is inexpensive to manufacture, is readily adaptable to the convenient packaging of plastic substances and which provides a neat, attractively appearing salable package.

The use of whipped cream and the like for decoration of desserts, cakes and like dishes is well known.

It has heretofore been impractical to produce whipped cream at a creamery and package such a prepared food product for distribution and sale in the small and convenient packages attractive to the retail consumer.

Such packages heretofore used have been fabricated from heavy, stiff cardboard and the like and which cardboard has usually been coated with a paraffin wax or the like to make the package moisture proof. Such packages are comparatively expensive to manufacture and since they are stiff are not adapted to conveniently dispense the plastic substance and are not readily convertible into a dispensing decorating device.

Further, wax or the like material taints food substances such as whipped cream, prepared icings, mayonnaise and the like, so that the food substance becomes repugnant, displeasing and unpleasant to the taste.

It will be seen that my invention overcomes these inherent disadvantages of the containers heretofore used and provides a novel, comparatively inexpensive dispensing decorating container which permits the packaging of whipped cream, at the creamery, for general distribution and sale to the consumer.

While in the description which follows and in the drawing, I describe my invention as particularly applied to a container for food substances, it will be understood that this is for purposes of illustration only and that my invention is not limited thereto but applies to a container for any other plastic substance compatible with the disclosure thereof.

The objects of my invention will be clear from the description which follows and from the drawing in which Fig. 1 is a side elevation of a container constructed in accordance with my invention partially broken away.

Fig. 2 is a front elevation of the container shown in Fig. 1 partially broken away.

Fig. 3 is a partial elevational view showing the decorating spout disposed in operative position extending from the container.

Fig. 4 is a plan view, in reduced scale, of the blank from which the outer container is formed.

Fig. 5 is a plan view, in reduced scale, showing one edge of the blank folded.

Fig. 6 is an elevational view of the inner container and the outer container in position for assembly together.

Referring now to the drawing, I provide a somewhat conically shaped, pliable and collapsible outer container 10, which is formed from the blank sheet 12, preferably fabricated from a thin, flimsy material such as paper or the like.

The blank sheet from which the outer container is formed is preferably of an isosceles triangular shape having an arcuate top edge 14, and inwardly converging side edges 16 and 18.

The blank sheet has arranged on one of the edges adjacent the apex an extending tab 20 to provide means whereby the dispensing and decorating spout associated with my novel dispensing package may be disposed in operative arrangement upon using the device, as will be more fully described.

Extending from one edge of the blank above the apex thereof to the upper intersection 22 of the tab with the other edge, are preferably arranged the tearing perforations 24, which cooperate with the tab to provide the means for disposing the spout into dispensing arrangement with the container as will be more fully described.

In order to form the outer container from this blank, the edge 18 is initially folded, as shown more particularly in Figure 5 and then the side edge 16 is folded about the apex so that it will overlap the edge 18 to which it is preferably heat sealed by any suitable adhesive 26 provided on the inner surface of the blank along the side edge 18 to thereby form the somewhat conically shaped outer container 10. For this purpose I prefer to use an adhesive which is substantially nontacky at ordinary temperatures, but which may be made cementitious under heat and pressure, such as a thermoplastic cement comprising vinyl resin, glyptal resin or a composition including cellulose nitrate and a thermoplastic resin compatible therewith or other suitable synthetic resin which is olfactorily or gustatorily inert and therefore will not taint food substances such as whipped cream and the like.

The perforations extend from one edge of the blank to the other in the form of an arc, so that they will, upon the formation of the container as described, assume a horizontal linear position above the apex of the container relatively thereto.

I prefer to fabricate a separate collapsible and pliable inner container 28 from a blank sheet which is similar to the outer container blank, except that the tab and perforations are preferably omitted so that the inner container will closely fit against the outer container when inserted therein. I prefer to indicate a tearing indicating line 30 on the inner container in any suitable manner, as by printing though it will be understood that, if desired, tearing perforations may be substituted.

I prefer to fabricate the inner container from a thin, flimsy sheet of material such as "Glassine", "Cellophane" or other cellulosic material impregnated or coated with an olfactorily and gustatorily inert synthetic resin such as vinyl resin, glyptal resin, alkyd resin and the like. I have found that such materials do not taint or affect the taste or flavor of food substances associated with them and food substances such as whipped cream, flavored icings, mayonnaise and the like may be safely packed for retail sale and distribution in a container fabricated therefrom.

Containers fabricated from such materials are impermeable to moisture and upon proper sealing thereof may be rendered air-tight.

Prior to filling the container with the plastic substance, I arrange in the apex 32 of the inner container the spout 34, which may, if desired, be provided with the usual decorative serrations 36.

The spout may be fabricated from heavy paper, cardboard, metal or other material depending upon the use to which my dispensing container is to be put.

After the insertion of the spout, the inner container may then be filled with a plastic food such as whipped cream and the like or other plastic substance.

The spout is provided with a taper that is somewhat greater than that of the inner container so that it will rest against the apex of the inner container, interiorly thereof, the weight and pressure of the packed plastic substance forcing the spout against the inner face of the container and wedging it in the apex.

The package is then sealed at its upper edge 38 preferably by passing the extreme opposed ends 40 and 42 of the package between hot crimping rolls to form the fluted joint 39.

The inner container, being provided with a thermoplastic resinous component, is rendered adhesive under heat and pressure and tightly secures the ends of the package together to provide an air-tight and moisture impermeable joint.

It will be understood that the inner container may, if desired, be dispensed with by directly coating the inner surface with a synthetic resinous composition.

The resulting package may be readily distributed for sale and its contents will be preserved a comparatively long time.

In order to convert my package into a dispensing container, it remains only to tear off the apex of the outer container along the perforations to thereby expose the apex of the inner container, which in turn is torn away along the indicating line to spontaneously dispose the spout into operative dispensing position against the shoulder 44 which has been thereby provided.

The plastic substance may then be squeezed through the spout by applying pressure to the walls of the collapsible container. It will be apparent that only so much of the plastic substance as may be at any time desired need be forced from the container.

It will be apparent that pressure of the plastic substance against the spout as it is forced therethrough will continuously urge the spout in operative dispensing position against the shoulder formed at the lower edge of the container.

It will be noted that my package may be used as a dispensing decorator, of especial interest to housewives, pastry cooks and the like, who may now purchase whipped cream, flavored icings and the like completely prepared for use and packed in a container readily convertible into a dispensing decorating device, the advantages of which are obvious.

It will be further understood that the size of the container and the size of the spout and the material from which it is formed may be varied to suit the material which is packed in it and the use to which it is put.

For example, lubricating grease may be packed in a container constructed in accordance with my invention, in which event the serrations on the spout may be omitted and a metal spout provided of predetermined size to be arranged in any corresponding size grease or lubricating opening, to thereby provide a sealed container which may be readily converted into a nozzled dispensing container.

It will be understood that, if desired, the inner container may be omitted, and the inner surface of the outer container coated with "Cellophane", "Glassine", vinyl resin, glyptal resin or a compound including nitro cellulose and a compatible resin or the like, and a spout combined therewith in the manner described above to thereby provide a simple modification of my novel dispensing decorating container.

It will be apparent that I have provided a container in which plastic food substances such as whipped cream, prepared icings, mayonnaise and the like can be packed for distribution and sale in small, convenient and attractive packages. It will be further apparent that I have provided such a container which may be readily converted into a dispensing and decorating device for the plastic substances held therein.

While my invention has been described in detail with specific examples, such examples are illustrative and are not given as limitations, since other modifications within the spirit and scope of the invention will be apparent to those skilled in the art. Hence, the invention is to be understood as limited only as indicated in the appended claims in which the intent is to set forth all the novelty of the prior art.

I claim:

1. In a device of the character described, a pliable and collapsible container adapted to store a plastic substance therein, said container terminating at one end in an apex, a pouring spout arranged in the container adjacent the apex and means whereby a portion of the apex may be torn from the container to thereby operatively dispose the said spout against the container outwardly thereof.

2. In a device of the character described, a sealed container enclosing a plastic substance, a spout arranged in the container and means on the container for tearing a part thereof from the container whereby the spout is operatively disposed extending outwardly from the container.

3. In combination, a sealed pliable and collapsible container, a spout arranged in the container, said container having perforations arranged adjacent the spout and a tearing tab on the container in communication with the said perforations whereby a portion of the container may be torn away along the line of the perforations to thereby dispose the spout in operative position.

4. In combination, a somewhat conically shaped sealed container, a spout arranged inwardly of the container adjacent the apex thereof, said container having perforations above the apex of the container and a tearing tab in operative communication with the said perforations whereby a portion of the container may be torn away along the line of the perforations to thereby dispose the spout in operative position.

5. In combination, a sealed package comprising an outer container and an inner container arranged in the outer container, a spout arranged in the inner container and means whereby coincident portions of the containers may be torn therefrom to provide nozzle openings through which the spout is thereby operatively disposed.

6. In combination, a sealed container, a spout arranged therein and means on the container for tearing a portion thereof from the container to thereby provide a shoulder against and through which the spout is disposed in operative position.

7. A collapsible dispensing container for plastic food substances fabricated from a thin tearable sheet coated with an olfactorily and gustatorily inert synthetic resin and comprising a body portion adapted to be sealed at one end after filling said container with said food substance and terminating at the other end in an apex, a pouring spout arranged in the container adjacent the apex and means on the container whereby a portion of the apex may be torn from the container to thereby dispose the spout in food dispensing position.

8. A collapsible dispensing container for plastic food substances fabricated from a thin tearable sheet and comprising a body portion adapted to be sealed at one end after filling said container with said food substance and terminating at the other end in an apex, a pouring spout arranged in the container adjacent the apex and means on the container whereby a portion of the apex may be torn from the container to thereby dispose the spout in food dispensing position.

9. A collapsible dispensing container for plastic food substances fabricated from a thin tearable sheet coated with an olfactorily and gustatorily inert substance and comprising a body portion adapted to be sealed at one end after filling said container with said plastic food substances and terminating at the other end in an apex and means on the container whereby a portion of the apex may be torn from the container to thereby provide a food dispensing spout.

CARL SEIDLER.